US011376903B2

(12) United States Patent
Frisch (10) Patent No.: US 11,376,903 B2
(45) Date of Patent: Jul. 5, 2022

(54) TOWING ASSEMBLY FOR MOTOR VEHICLE

(71) Applicant: Ford Global Technologies, LLC, Dearborn, MI (US)

(72) Inventor: Vincent Jannick Frisch, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 16/823,788

(22) Filed: Mar. 19, 2020

(65) Prior Publication Data

US 2020/0317009 A1 Oct. 8, 2020

(30) Foreign Application Priority Data

Apr. 8, 2019 (DE) .................... 102019205021.2

(51) Int. Cl.
*B60D 1/04* (2006.01)
*B60D 1/56* (2006.01)

(52) U.S. Cl.
CPC ........ *B60D 1/04* (2013.01); *B60D 1/56* (2013.01)

(58) Field of Classification Search
CPC ... B60D 1/04; B60D 1/56; B60D 1/18; B60D 1/182; B60D 1/187; B60D 1/143
See application file for complete search history.

(56) References Cited

U.S. PATENT DOCUMENTS

| 5,716,066 | A | 2/1998 | Chou et al. | |
|---|---|---|---|---|
| 6,382,654 | B1 * | 5/2002 | Mahncke | B60D 1/488 280/495 |
| 7,290,783 | B2 * | 11/2007 | Dornbos | B60D 1/244 280/495 |
| 8,246,069 | B2 * | 8/2012 | Ladzinski | B60D 1/56 280/495 |
| 8,322,763 | B2 | 12/2012 | Tejler et al. | |
| 8,371,602 | B1 * | 2/2013 | Peschansky | B60D 1/488 280/495 |
| 9,499,020 | B2 * | 11/2016 | Degenkolb | B60D 1/565 |
| 9,914,332 | B2 * | 3/2018 | Jordan | B60D 1/485 |
| 9,981,516 | B1 * | 5/2018 | Alvarez | B60D 1/06 |
| 10,399,398 | B2 * | 9/2019 | Setru | B60D 1/52 |
| 10,464,382 | B2 * | 11/2019 | Ghannam | B60D 1/243 |
| 10,787,052 | B2 * | 9/2020 | Shenaq | B60D 1/565 |
| 10,933,706 | B2 * | 3/2021 | Shenaq | B60D 1/143 |

(Continued)

FOREIGN PATENT DOCUMENTS

| DE | 1062554 B | 7/1959 |
|---|---|---|
| DE | 1914461 U | 4/1965 |

(Continued)

*Primary Examiner* — Tony H Winner
*Assistant Examiner* — Michael R Stabley
(74) *Attorney, Agent, or Firm* — Vichit Chea; Carlson, Gaskey & Olds, P.C.

(57) ABSTRACT

A towing assembly for a motor vehicle according to an exemplary aspect of the present disclosure includes, among other things, a longitudinal member mount configured to attach to a longitudinal member of the motor vehicle, and a pulling element configured to transmit a tensile force to the longitudinal member and to translate relative to the longitudinal member in response to a compressive force. The pulling element includes a rod portion and a hook portion vertically offset from the rod portion.

15 Claims, 4 Drawing Sheets

(56) References Cited

U.S. PATENT DOCUMENTS

| | | | | |
|---|---|---|---|---|
| 2009/0184493 A1* | 7/2009 | Eifert | ................ | B60D 1/565 |
| | | | | 280/491.5 |
| 2019/0084361 A1* | 3/2019 | Ghannam | ............ | B60D 1/56 |
| 2020/0023697 A1* | 1/2020 | Shenaq | ............... | B60D 1/54 |
| 2020/0171894 A1* | 6/2020 | Shenaq | ............... | B60D 1/04 |

FOREIGN PATENT DOCUMENTS

| | | |
|---|---|---|
| DE | 3612206 C1 | 10/1987 |
| DE | 202009006554 U1 | 10/2010 |
| DE | 102010024572 A1 | 12/2011 |
| DE | 202015105094 U1 | 11/2015 |
| JP | 2008189020 A | 8/2008 |

* cited by examiner

TOWING ASSEMBLY FOR MOTOR VEHICLE

RELATED APPLICATION(S)

This application claims priority to German Patent Application No. 102019205021.2, filed on Apr. 8, 2019, the entirety of which is herein incorporated by reference.

TECHNICAL FIELD

This disclosure relates to a towing assembly for a motor vehicle.

BACKGROUND

Some motor vehicles, such as trucks or sport utility vehicles (SUVs), include at least one tow hook, and often include two tow hooks are arranged symmetrically on opposite sides of a centerline of the vehicle. With regard to the load-bearing capacity, such tow hooks are typically designed with generous proportions, such that they can transmit a total tensile force above the weight force of the motor vehicle, for example about 150% of the weight force. When designing such tow hooks, both tensile load-bearing and compressive load-absorbing properties are considered.

U.S. Pat. No. 5,716,066 discloses a towing assembly for a vehicle which has longitudinal members on both sides and has a front bumper. In this case, a bumper mount is in each case fastened to the bumper and a longitudinal member mount which is separate therefrom is in each case fastened to a longitudinal member. According to one embodiment which is shown, the bumper mount has a first through-bore and the longitudinal member mount has a second through-bore having an internal thread. A pulling element has a straight portion which is guided through both through-bores, and also a front-side eye. The straight portion has, at the end, an outer thread which is screwed into the second through-bore and onto which a securing nut is screwed.

JP 2008-189020 discloses a front-side structure of a vehicle having two longitudinal members, which protrude toward the front beyond a cross member. At the front of the cross member, a hook unit is fastened to the underside of each longitudinal member. The hook unit has a towing hook at the front and a locking hook at the rear. When absorbing a load from a front direction, the longitudinal members can deform and the locking hook can come into contact with the front of the cross member. In this way, bending of the longitudinal member toward the bottom is prevented or at least limited.

U.S. Pat. No. 8,322,763 discloses a front bumper arrangement for a truck which has longitudinal members on both sides. In this case, left-hand and right-hand mounts are fastened to a respective one of the longitudinal members and are connected in a rear region by way of a transversely extending member. Furthermore, a transversely extending middle part is fastened, at the front, to the mounts. The middle part has at least one pocket into which a respective towing pin can be inserted.

SUMMARY

A towing assembly for a motor vehicle according to an exemplary aspect of the present disclosure includes, among other things, a longitudinal member mount configured to attach to a longitudinal member of the motor vehicle, and a pulling element configured to transmit a tensile force to the longitudinal member and to translate relative to the longitudinal member in response to a compressive force. The pulling element includes a rod portion and a hook portion vertically offset from the rod portion.

In a further non-limiting embodiment of the foregoing towing assembly, the hook portion is vertically below the rod portion.

In a further non-limiting embodiment of any of the foregoing towing assemblies, the pulling element includes a support portion supporting the hook portion, and the support portion extends vertically downward and forward from the rod portion.

In a further non-limiting embodiment of any of the foregoing towing assemblies, a bumper mount is configured to attach to a bumper of the motor vehicle, and the bumper mount is configured to transfer a compressive force to the pulling element.

In a further non-limiting embodiment of any of the foregoing towing assemblies, the bumper mount is configured to attach to a bottom surface or a rear surface of a bumper.

In a further non-limiting embodiment of any of the foregoing towing assemblies, the bumper mount is vertically offset from the rod portion.

In a further non-limiting embodiment of any of the foregoing towing assemblies, the bumper mount is integrally formed with the pulling element.

In a further non-limiting embodiment of any of the foregoing towing assemblies, the bumper mount is formed separately from the pulling element.

In a further non-limiting embodiment of any of the foregoing towing assemblies, the bumper mount includes a channel on a bottom surface thereof receiving the pulling element.

In a further non-limiting embodiment of any of the foregoing towing assemblies, the longitudinal member mount includes a sleeve portion having a passage opening receiving the rod portion of the pulling element.

In a further non-limiting embodiment of any of the foregoing towing assemblies, a fastener is attached to the rod portion on a side of the sleeve portion opposite the hook portion.

In a further non-limiting embodiment of any of the foregoing towing assemblies, the fastener is a nut and the rod portion includes threads configured to interface with the nut.

In a further non-limiting embodiment of any of the foregoing towing assemblies, the fastener is configured to preload the pulling element relative to a bumper mount and the longitudinal member mount.

In a further non-limiting embodiment of any of the foregoing towing assemblies, the longitudinal support includes lateral support portions configured to attach to opposite lateral faces of the longitudinal support.

A motor vehicle according to an exemplary aspect of this disclosure includes, among other things, a bumper, a longitudinal member supporting the bumper, and any one of the aforementioned towing assemblies.

DETAILED DESCRIPTION

This disclosure relates to a towing assembly for a motor vehicle. The disclosed towing assembly has enhanced load-absorbing properties relative to prior designs. These and other benefits will be appreciated from the below description.

This disclosure provides a towing assembly for a motor vehicle. Suitable motor vehicles are passenger cars, SUVs, trucks, and off-road vehicles, as examples. The towing assembly is used to tow the motor vehicle. Towing in the context of this disclosure not only comprises towing by way of a towing vehicle, but also all other possible variants with which it is possible to free a motor vehicle using the towing hook.

The towing assembly has a pulling element with an application region for a forwardly directed tensile force. The application region is that region in which, during proper use, a tensile force is intended to be applied, by means of which force the motor vehicle is towed. Such an application region can be configured on a hook or hook portion, or on an eye. It is, for example, possible for a chain, a rope loop, or the like, to be attached to the application region. Accordingly, a hook can for example be mounted on an eye. Here and in the following text, a force or force component of which at least a proportion is directed toward the front, that is to say along the longitudinal axis (which herein is referred to as the X axis) of the vehicle and in the direction of travel of the vehicle, is referred to as a forwardly directed tensile force. In this case, the corresponding force can also have components in the direction of the transverse axis (Y axis, which extends generally in a side-to-side direction) and/or vertical axis (Z axis, which extends in the up-and-down direction) of the motor vehicle. The pulling element is configured to absorb and transmit the corresponding force. In order to have the stability necessary for this purpose, it is usually made of metal, for example steel. In total, two towing assemblies can be provided, such that each towing assembly (and thus each pulling element) absorbs only a part (ideally 50% each) of the overall load during the towing operation. It is possible for the tensile force that an individual towing assembly can absorb to be over 100%, such as over 120%, of the weight force of the vehicle. The pulling element is usually manufactured in one piece, for example by way of forging, although a plurality of elements may be prefabricated separately and welded together, for example.

Further, the towing assembly has a bumper mount which is intended for fastening to a front bumper and a longitudinal member mount, which in turn is intended for fastening to a longitudinal member. In this case, the front bumper and the longitudinal member are assigned to the motor vehicle to which the towing assembly is fastened or is intended to be fastened. The term "bumper" in this context also includes a bumper cross member which extends, in the transverse direction, between the longitudinal members of the vehicle chassis, which are arranged on both sides. The towing assembly is provided, firstly, for being fastened to the front bumper by way of the bumper mount and, secondly, for being fastened to the longitudinal member by way of the longitudinal member mount. In this case, one or more fastening points or fastening regions can be provided both on the front bumper and on the longitudinal member. With regard to the type of fastening, various possibilities are available, with form-fitting, force-fitting and/or materially bonded connections being possible. The longitudinal member mount could thus in particular be welded to the longitudinal member, but possibly also screwed or riveted thereto, for example. The bumper mount can for example be screwed to the bumper. For reasons of stability, both the bumper mount and the longitudinal member mount are typically manufactured from metal, for example steel.

The bumper mount, the longitudinal member mount and the pulling element are configured in such a way that, in the assembled state, the pulling element is arranged below the bumper. As an additional aspect, the towing assembly, in particular the bumper mount and the pulling element connected thereto, are configured in such a way that, in the assembled state, the pulling element protrudes toward the front, in the longitudinal direction, beyond the bumper by less than 10 cm, which reduces the likelihood of interfering with an adjacent object.

According to this disclosure, the pulling element is connected in a tensile force-transmitting manner to the bumper mount and the longitudinal member mount, whereas it can be displaced rearward in relation to the longitudinal member mount by way of a rearwardly directed compressive force which acts relative to the longitudinal member mount. This means that the connection between the pulling element, on the one hand, and both the bumper mount and the longitudinal member mount, on the other hand, is configured in such a way that the abovementioned tensile force is transmitted to the two mounts, and from them further to the vehicle chassis or the vehicle body. In this case, at least a proportion of the tensile force is transmitted both to, or by way of, the bumper mount and the longitudinal member mount. This makes it possible to transmit a larger part of the tensile force to the longitudinal member mount, since the latter is connected to the longitudinal member, which usually has greater stability in relation to tensile forces than the bumper. A high level of stability in relation to any laterally or perpendicularly acting force components is also provided by way of the fastening to the longitudinal member, on the one hand, and to the bumper, on the other hand. Whereas a tensile force is therefore transmitted to both mounts, the pulling element can be displaced rearward in relation to the longitudinal member mount by way of a rearwardly directed compressive force. In this case, the compressive force acts relative to the longitudinal member mount, that is to say this is a rearwardly directed (additional) force or force component which acts on the pulling element in relation to the longitudinal member mount. In this case, the compressive force does not necessarily have to act parallel to the longitudinal axis of the vehicle but can possibly also have laterally or vertically acting components. In response to a compressive force of this kind, the pulling element can still be fastened to the bumper by way of the bumper mount, such that the pulling element is displaced in relation to the longitudinal member mount (only) together with a deformation and/or displacement of the bumper. In any case, it is ensured that the pulling element does not behave in a largely rigid manner on account of the fastening thereof to the longitudinal member, but rather is able to yield at least to the same extent as the bumper. The compressive force can act directly on the pulling element and/or on the bumper and thus indirectly by way of the bumper mount on the pulling element.

In order for the pulling element to be able to be displaced rearward in relation to the longitudinal member mount, provision can be made for the compressive force to have to exceed a designated threshold value. However, if this is the case, the threshold value lies significantly below a designated maximum load under the action of tensile force. It is for example possible to provide for the connection between the pulling element and the longitudinal member mount to be designed for a proportional tensile force, which corresponds to at least 50% or at least 80% of the weight force of the vehicle, while the threshold value for the compressive force can be less than 5% of the weight force or less than 1% of the weight force.

In order to avoid the situation whereby small compressive forces, which act exclusively on the pulling element, already lead to the displacement thereof, the pulling element can be connected in a compressive force-transmitting manner to the bumper mount. This means that the pulling element is connected to the bumper mount both in a tensile force-transmitting manner and a compressive force-transmitting manner. In general, this has the effect that the displacement of the pulling element is possible only in the case of simultaneous deformation and/or displacement of the bumper. In this case, with regard to the stability of the connection between the pulling element and the bumper mount, the connection does not have to be of symmetrical configuration, that is to say it can be loadable to a greater extent under the action of tensile force than under the action of compressive force.

In order to realize the abovementioned tensile force-transmitting and compressive force-transmitting connection and for example also to simplify the production process, the pulling element can be configured in one piece with the bumper mount. In that case, it would also be possible to view the bumper mount as part of the pulling element. In this way, the pulling element and the bumper mount can be manufactured in one piece. By way of example, they can be forged from a single piece of metal. Other forming methods or even primary shaping methods are also possible.

According to another embodiment, the pulling element is manufactured separately from the bumper mount, and in a subsequent step is welded to the bumper mount, and is held in a bracket portion of the bumper mount. The bracket portion is partially engaging around the pulling element but being open toward the bottom and the rear. The bracket portion partially engages around the pulling element.

The pulling element is guided in a rearwardly displaceable manner on the longitudinal member mount. This means that guidance is provided by way of a laterally and/or vertically provided form fit between the longitudinal member mount and the pulling element. In this case, a more or less large amount of play between the longitudinal member mount and the pulling element can be provided. In any case, on account of the guidance, no arbitrary movements of the pulling element are possible, rather an at least partially guided displacement takes place.

In particular, the pulling element can have a rod portion which extends in a longitudinal direction and which is at least partially introduced into a passage opening of the longitudinal member mount. The rod portion is usually of elongate configuration and can have an at least partially constant cross section. The longitudinal member mount has a passage opening which, in the assembled state, extends in the longitudinal direction of the motor vehicle and which, by way of the profile thereof, defines the possible relative movement of the rod portion. In the normal state, the rod portion is at least partially introduced, from the front, into the passage opening of the longitudinal member mount, whereas when a compressive force is applied it is guided further into the passage opening and is at least partially guided through the latter.

In order to firstly improve the overall cohesion of the towing assembly and to secondly ensure an effective force transmission of the tensile force to the longitudinal member mount, the rod portion can be preloaded between the bumper mount and the longitudinal member mount by way of a preloading element. It could also be the that, as a result of the action of the preloading element, a force is produced between the longitudinal member mount and the bumper mount by way of the rod portion, the force being directed toward the respectively other element. However, this in particular ensures that, under the action of a tensile force, the latter is actually transmitted to the longitudinal member mount and thus to the longitudinal member.

According to one embodiment, the rod portion has an outer thread which protrudes at least partially rearward from the passage opening and onto which a nut is screwed. The nut is dimensioned in such a way that it cannot be guided through the passage opening. On the one hand, by way of the nut, a form fit between the pulling element and the longitudinal member mount can be produced, the form fit making the transmission of tensile force possible. However, the abovementioned preloading action can also be produced by correspondingly firm tightening of the nut, that is to say the nut constitutes the preloading element in that case.

An aspect of this disclosure relates to providing a secure connection between the longitudinal member mount and the longitudinal member. The longitudinal member mount is typically arranged at least partially below the longitudinal member. A portion of the longitudinal member mount can accordingly be provided for being fastened to an underside of the longitudinal member. As an alternative or in addition thereto, the longitudinal member mount can have lateral support portions which are intended for fastening to sides of the longitudinal member which lie opposite each other in a transverse direction. The lateral support portions extend in a longitudinal direction and in a vertical direction and are provided for at least partially bearing against the sides of the longitudinal member. In this case, each lateral support portion can bear against the side of the longitudinal member from the outside or, for example in the case of a downwardly open U-shaped profile of the longitudinal member, from the inside. The corresponding fastening can be effected, for example, by screwing or welding.

By way of example, in order to connect and guide the pulling element on the longitudinal member, the rod portion can be arranged as closely as possible below the longitudinal member. On the other hand, for accessibility to the abovementioned application region, the application region is arranged vertically lower than the rod portion. Thus, the pulling element has a support portion which extends downward in relation to the rod portion and at the end of which a hook portion, which has the application region, is arranged. In this case, the support portion, like the rod portion, can be of elongate and rod-shaped configuration, but it extends downward. By way of example, it can extend, from the rod portion, obliquely downward toward the front. By way of example, the support portion can be held at least partially in the abovementioned bracket portion of the bumper mount. The hook portion, which has the application region, is configured at the end of the support portion. Usually, the hook portion is of hook-like configuration, but it can also be of closed configuration, in the form of an eye.

Figure 1:
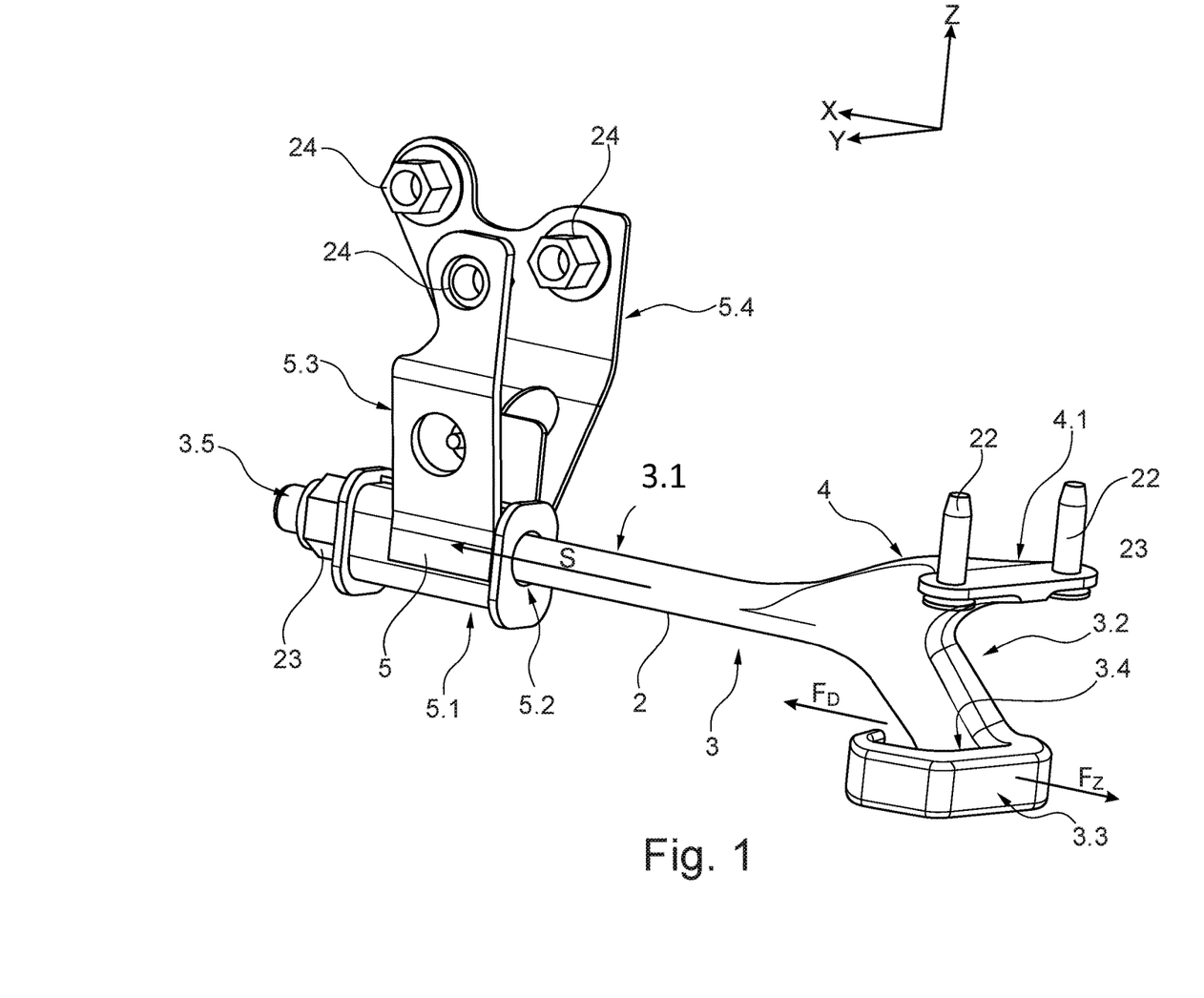
FIG. 1 is a perspective illustration of a first embodiment of a towing assembly according to this disclosure.
Figure 2:
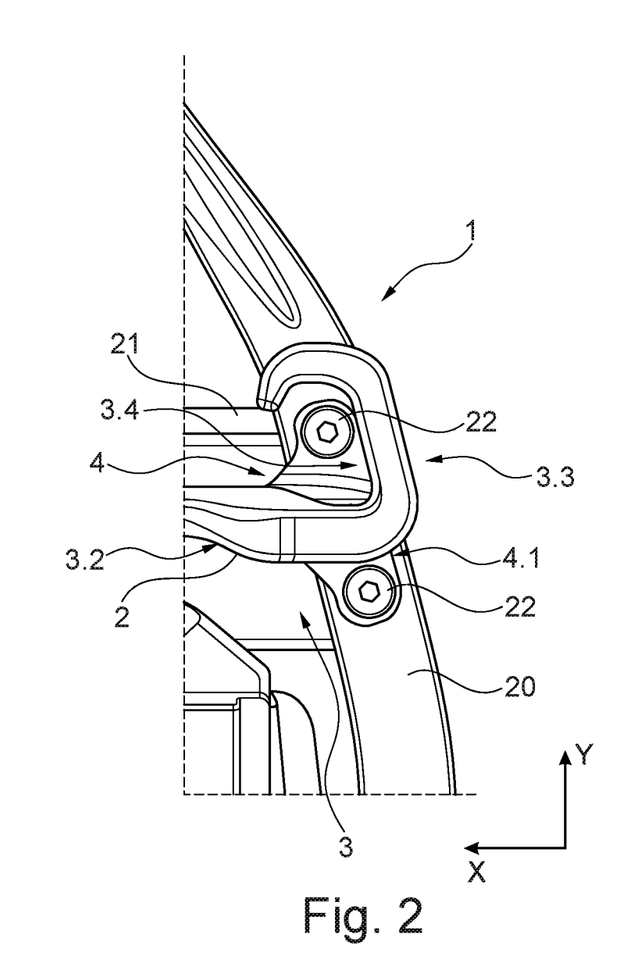
FIG. 2 is a view from below of a part of a motor vehicle with the towing assembly of FIG. 1.
Figure 3:
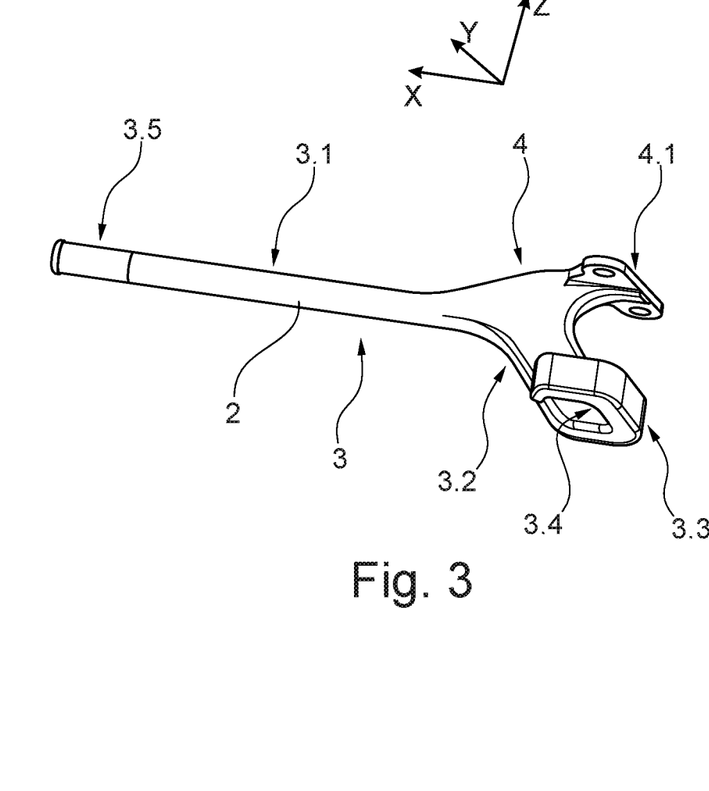
FIG. 3 is a perspective illustration of a pulling element of the towing assembly from FIG. 1.

FIGS. 1-3 show a first embodiment of a towing assembly 1 (FIG. 2). In all the figures, the X, Y and Z axes of the motor vehicle are drawn in a manner corresponding to the intended installation position of the towing assembly 1. While only one towing assembly 1 is shown, a motor vehicle may have two towing assemblies 1 arranged symmetrically on opposite sides of a centerline of the motor vehicle.

The towing assembly 1 includes two components, namely a pulling apparatus 2, which is illustrated individually in FIG. 3, and a longitudinal member mount 5. The longitudinal member mount 5 is configured for fastening to a longitudinal member 21, and specifically in such a way that it is arranged partially below the longitudinal member 21. Two lateral support portions 5.3, 5.4, formed of sheet-metal parts, of the longitudinal member mount 5 extend upward and are provided with weld nuts 24 by way of which they can be screwed to the longitudinal member. In the illustrated embodiment, the weld nuts 24 are arranged on the inside, as a result of which the lateral support portions 5.3, 5.4 can be arranged, for example, on the inside in a downwardly open U-shaped profile of the longitudinal member 21. As an alternative, the weld nuts 24 could also be arranged on the outside of the lateral support portions 5.3, 5.4, such that the latter can be arranged on the outer sides of the longitudinal member 21. In that case, the connection is effected by way of screws (not illustrated), but other types of connection, for example riveting or welding, to the longitudinal member 21 could alternatively also be selected. The longitudinal member mount 5 also has a sleeve portion 5.1 which is passed through by a passage opening 5.2 which extends parallel to the X axis. In the example which is shown, the sleeve portion 5.1 is also configured from one or more sheet-metal parts and welded to the lateral support portions 5.3, 5.4. However, as an alternative, the mentioned portions 5.1, 5.3, 5.4 could also be manufactured in one piece, for example by way of casting.

In one example, the pulling apparatus 2 is forged from a single steel part and has a pulling element 3 and a bumper mount 4. The bumper mount 4 has a fastening portion 4.1 which comes to bear against an underside of a bumper 20 and is fastened to the latter by means of two rivets 22. The pulling element 3, which is configured in one piece with the bumper mount 4, has three portions. An elongate rod portion 3.1 which extends parallel to the X axis is guided through the passage opening 5.2 and protrudes rearward from the latter. At the front, the rod portion 3.1 is adjoined by a support portion 3.2 which extends obliquely downward toward the front. A hook portion 3.3, which has an application region 3.4 for a tensile force $F_Z$, is configured at the end of the support portion 3.2. The forwardly directed tensile force $F_Z$ is applied when the motor vehicle is being towed, the hook portion interacting with a loop of a tow rope, an eye of a chain, or the like, for example. The tensile force $F_Z$ is transmitted, on account of the one-piece configuration of the pulling element 3 and the bumper mount 4, to the latter and thus also to the bumper 20. In addition, however, transmission to the longitudinal member mount 5 and thus to the longitudinal member 21 also takes place. To this end, a nut 23 is screwed onto an outer thread 3.5, which is configured at the end of the rod portion 3.1, to such an extent that it produces a form fit with the sleeve portion 5.1 of the longitudinal member mount 5. More specifically, the nut 23 is screwed on to such an extent that a preloading action is produced, by way of which the rod portion 3.1 is preloaded between the longitudinal member mount 5 and the bumper mount 4. The corresponding preloading action ensures that a substantial part of the tensile force $F_Z$ is transmitted to the longitudinal member 21.

In the present example, the rod portion 3.1 is guided with play within the passage openings 5.2. Irrespective of the fastening to the bumper 20, the rod portion 3.1 cannot be displaced toward the front in relation to the longitudinal member mount 5, since this is prevented by way of the nut 23. However, in the case that a rearwardly directed compressive force FD acts on the pulling element 3, the compressive force being able to act thereon either directly or by way of the bumper 20 and the bumper mount 4, the pulling element 3 (and usually the pulling apparatus 2 in its entirety) can be displaced, along a displacement path S, rearward in relation to the longitudinal member mount 5. This means that in spite of the strong connection of the longitudinal member mount 5 to the longitudinal member 21, the strong connection being necessary for absorbing large tensile forces $F_Z$, the pulling element 3 does not behave like a substantially rigid obstacle. It is also advantageous for the rod portion 3.1 to be guided within the passage openings 5.2, as a result of which the load-absorbing behavior of the towing assembly 1 can be predicted to a significantly better extent. As an additional aspect, the towing assembly 1 is configured in such a way that, in the assembled state, the pulling element 3 protrudes toward the front, in the longitudinal direction, beyond the bumper 20 by less than 10 cm, as can be seen, for example, in the view from below in FIG. 2.

Figure 4:
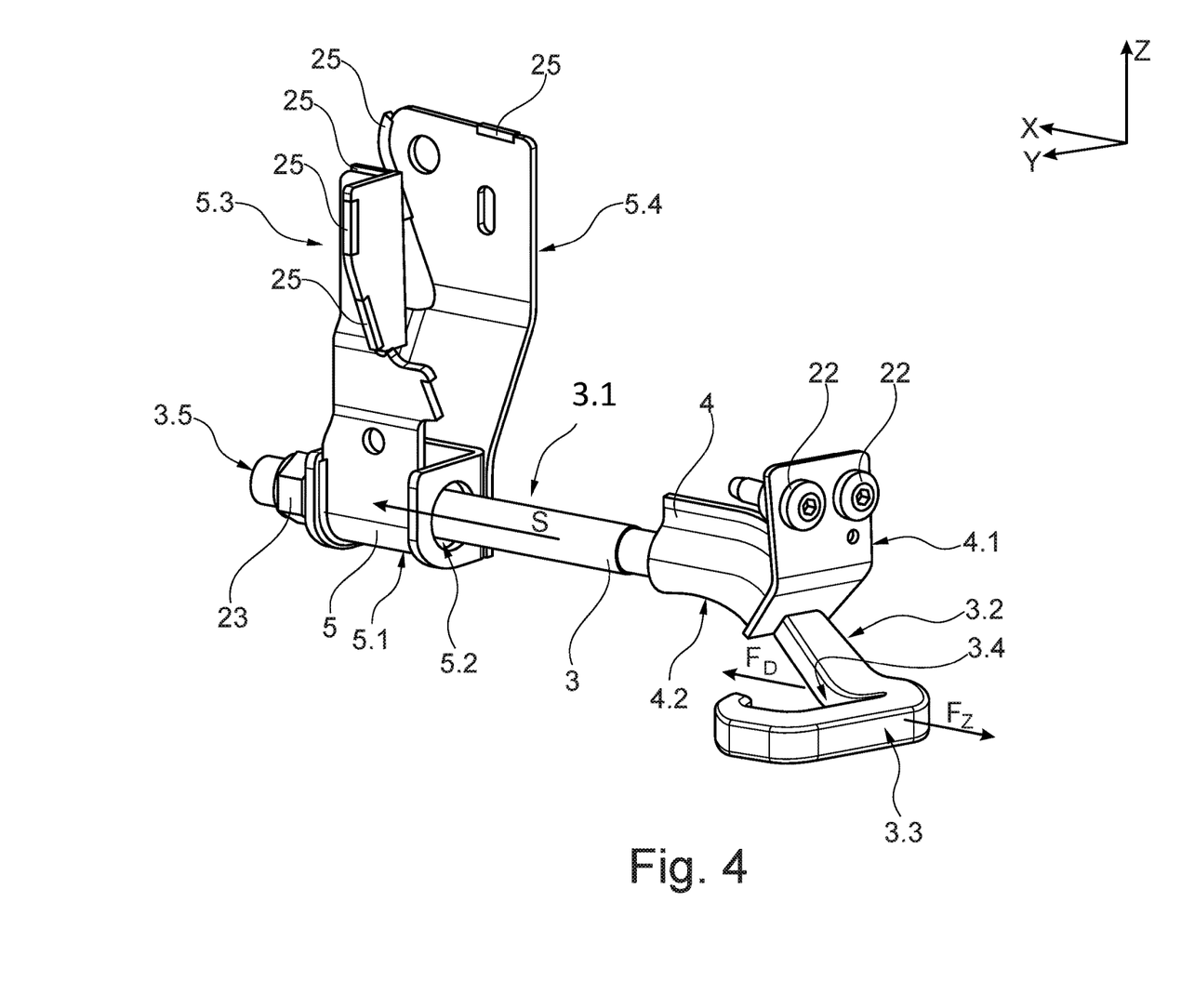
FIG. 4 is a perspective illustration of a second embodiment of a towing assembly according to this disclosure.
Figure 5:
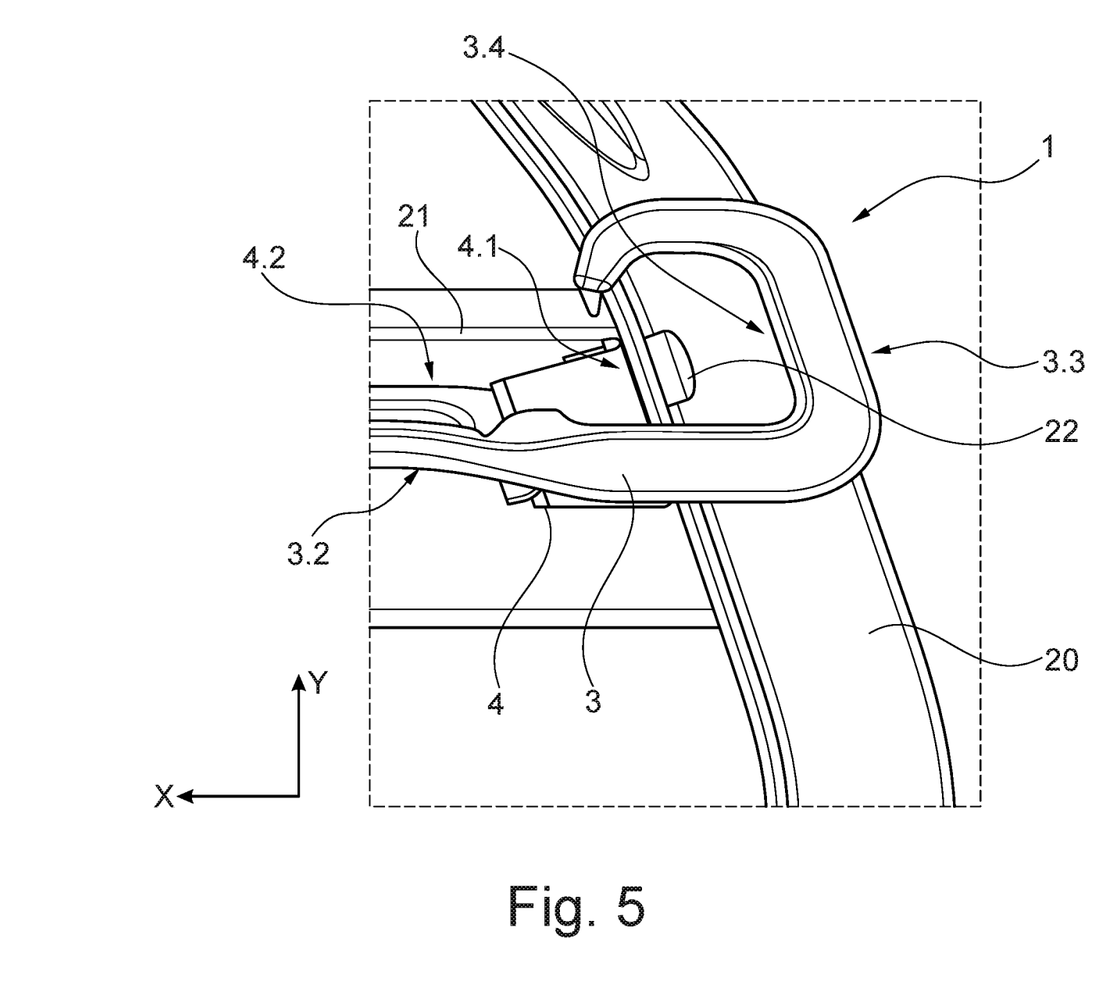
FIG. 5 is a view from below of a part of a motor vehicle with the towing assembly from FIG. 4.

FIGS. 4 and 5 show a second embodiment of a towing assembly 1 (FIG. 5) according to this disclosure, the second embodiment being substantially similar to, and substantially corresponding to, the embodiment illustrated in FIGS. 1-3. The aspects of the two embodiments which are similar will not be explained again for the sake of brevity. Various differences will now be described.

In FIGS. 4 and 5, the pulling element 3 is manufactured in one piece as a forged part, whereas the bumper mount 4 is manufactured separately therefrom, and in particular may be made from sheet-metal parts. In this case, the bumper mount 4 also has a fastening portion 4.1, but this is configured, in contrast to the embodiment in FIGS. 1-3, not for fastening to an underside of a bumper 20 but rather to a rear side thereof. In this case, the connection is effected by way of rivets 22. Moreover, on the bumper mount 4, there is configured a bracket portion 4.2 which partially surrounds the pulling element 3, and specifically in particular parts of the rod portion 3.1 and of the support portion 3.2, but which is open toward the bottom (in the negative Z direction) and toward the rear (in the X direction). Aside from the fact that the two-part manufacturing of the pulling element 3 and the bumper mount 4 makes it possible to realize specific forms which would be difficult to produce in a one-piece manufacturing operation, in the illustrated embodiment the connection between the bracket portion 4.2 and the pulling element 3 can be configured in such a way that, at least when a compressive force FD acts only on the pulling element 3, but not on the bumper 20, the pulling element 3 is detached in a planned manner from the bumper mount 4. For this purpose, the pulling element could, for example, be secured only by way of a form fit within the bracket portion 4.2, the form fit being released by way of a slight plastic or elastic deformation of the bracket portion 4.2. As an alternative, minimal welding between the pulling element 3 and the bracket portion 4.2 could be provided, the welding, however, being designed, in terms of its load-bearing capacity, such that it already yields under the action of a comparatively small compressive force FD.

Another difference is that the lateral support portions 5.3, 5.4 are connected to the longitudinal member 21 not by way of a screw connection, but by way of weld seams 25. In order to increase the stability of the connection, provision is made for each of the lateral support portions 5.3, 5.4 to have at least two weld seams.

Directional terms are used herein with reference to the normal operational attitude of a motor vehicle. It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A towing assembly for a motor vehicle, comprising:
a longitudinal member mount configured to attach to a longitudinal member of the motor vehicle; and
a pulling element configured to transmit a tensile force to the longitudinal member and to translate relative to the longitudinal member in response to a compressive force, wherein the pulling element includes a rod portion and a hook portion vertically offset from the rod portion, wherein the longitudinal member includes lateral support portions configured to attach to opposite lateral faces of the longitudinal member.

2. The towing assembly as recited in claim 1, wherein the hook portion is vertically below the rod portion.

3. The towing assembly as recited in claim 1, wherein:
the pulling element includes a support portion supporting the hook portion, and
the support portion extends vertically downward and forward from the rod portion.

4. The towing assembly as recited in claim 1, further comprising a bumper mount configured to attach to a bumper of the motor vehicle, wherein the bumper mount is configured to transfer a compressive force to the pulling element.

5. The towing assembly as recited in claim 4, wherein the bumper mount is configured to attach to a bottom surface or a rear surface of a bumper.

6. The towing assembly as recited in claim 4, wherein the bumper mount is vertically offset from the rod portion.

7. The towing assembly as recited in claim 6, wherein the bumper mount is integrally formed with the pulling element.

8. The towing assembly as recited in claim 6, wherein the bumper mount is formed separately from the pulling element.

9. The towing assembly as recited in claim 8, wherein the bumper mount includes a channel on a bottom surface thereof receiving the pulling element.

10. The towing assembly as recited in claim 1, wherein the longitudinal member mount includes a sleeve portion having a passage opening receiving the rod portion of the pulling element.

11. The towing assembly as recited in claim 10, further comprising a fastener attached to the rod portion on a side of the sleeve portion opposite the hook portion.

12. The towing assembly as recited in claim 11, wherein the fastener is a nut and the rod portion includes threads configured to interface with the nut.

13. The towing assembly as recited in claim 11, wherein the fastener is configured to preload the pulling element relative to a bumper mount and the longitudinal member mount.

14. A towing assembly for a motor vehicle, comprising:
a longitudinal member mount configured to attach to a longitudinal member of the motor vehicle, wherein the longitudinal member mount includes a sleeve portion having a passage opening, wherein the longitudinal member includes lateral support portions configured to attach to opposite lateral faces of the longitudinal member;
a pulling element configured to transmit a tensile force to the longitudinal member and to translate relative to the longitudinal member in response to a compressive force, wherein the pulling element includes a rod portion and a hook portion vertically below the rod portion, wherein the pulling element includes a support portion supporting the hook portion, and the support portion extends vertically downward and forward from the rod portion, wherein the rod portion is partially received in the passage opening;
a bumper mount configured to attach to a bumper of the motor vehicle, wherein the bumper mount is configured to transfer a compressive force to the pulling element, the bumper mount is at least partially vertically above the rod portion; and
a fastener attached to the rod portion on a side of the sleeve portion opposite the hook portion, wherein the fastener is configured to preload the pulling element relative to the bumper mount and the longitudinal member mount.

15. A motor vehicle, comprising:
a bumper;
a longitudinal member supporting the bumper; and
a towing assembly, comprising:
a longitudinal member mount attached to the longitudinal member, wherein the longitudinal member mount includes a sleeve portion having a passage opening, wherein the longitudinal member includes lateral support portions attached to opposite lateral faces of the longitudinal member;
a pulling element configured to transmit a tensile force to the longitudinal member and to translate relative to the longitudinal member in response to a compressive force, wherein the pulling element includes a rod portion and a hook portion vertically below the rod portion, wherein the pulling element includes a support portion supporting the hook portion, and the support portion extends vertically downward and forward from the rod portion, wherein the rod portion is partially received in the passage opening;
a bumper mount attached to the bumper, wherein the bumper mount is configured to transfer a compressive force to the pulling element, the bumper mount is at least partially vertically above the rod portion; and
a fastener attached to the rod portion on a side of the sleeve portion opposite the hook portion, wherein the fastener is configured to preload the pulling element relative to the bumper mount and the longitudinal member mount.

* * * * *